US009182228B2

(12) United States Patent
Pollock et al.

(10) Patent No.: US 9,182,228 B2
(45) Date of Patent: Nov. 10, 2015

(54) MULTI-LENS ARRAY SYSTEM AND METHOD

(75) Inventors: David Boyd Pollock, Guntersville, AL (US); Patrick John Reardon, Madison, AL (US); Theodore Earl Rogers, Huntsville, AL (US); Christopher N. Underwood, Huntsville, AL (US); Geoffrey Egnal, Washington, DC (US); Bennett Sampson Wilburn, Vienna, VA (US); Stephen Kenneth Pitalo, Huntsville, AL (US)

(73) Assignees: Sony Corporation, Tokyo (JP); University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 11/456,745

(22) Filed: Jul. 11, 2006

(65) Prior Publication Data

US 2007/0188653 A1    Aug. 16, 2007

Related U.S. Application Data

(60) Provisional application No. 60/772,670, filed on Feb. 13, 2006.

(51) Int. Cl.
*H04N 5/225* (2006.01)
*G01C 11/02* (2006.01)
(Continued)

(52) U.S. Cl.
CPC .............. *G01C 11/02* (2013.01); *G01C 11/06* (2013.01); *G03B 15/006* (2013.01); *G03B 37/04* (2013.01);
(Continued)

(58) Field of Classification Search
CPC .......................... G03B 39/00; B60R 2300/105
USPC ................... 348/373, 211.1, 218.1, 340, 117
See application file for complete search history.

(56) References Cited

U.S. PATENT DOCUMENTS 2,104,976 A    1/1938  Eliel
2,433,534 A *  12/1947 Sonne ............................. 396/8
(Continued)

FOREIGN PATENT DOCUMENTS

CN    1679337 A    10/2005
EP    1 056 642      3/2002
(Continued)

OTHER PUBLICATIONS

International Search Report and Written Opinion dated Feb. 7, 2008, for corresponding International Application No. PCT/US2007/062070 (8 pages).
(Continued)

*Primary Examiner* — Gary C Vieaux
(74) *Attorney, Agent, or Firm* — Wolf, Greenfield & Sacks, P.C.

(57) ABSTRACT

An image capture system comprises a plurality of cameras and a camera mount. The camera mount has a curved portion, and the plurality of cameras are secured to the curved portion. The cameras are oriented radially inward relative to the curved portion of the camera mount, such that the lines of sight of the cameras intersect. Images are captured substantially simultaneously with the plurality of cameras. The captured images are stitched together to form a collective image. The image capture system may be positioned in an aerial vehicle to provide overhead views of an environment, and captured images may be transmitted to a remote location for viewing in substantially real time. A remote user may indicate a region of interest within the collective image, and the image capture system may render a portion of the collective image in accordance with the user's indications.

22 Claims, 13 Drawing Sheets

(51) Int. Cl.

| | | |
|---|---|---|
| G01C 11/06 | (2006.01) | |
| G03B 15/00 | (2006.01) | |
| G03B 37/04 | (2006.01) | |
| G06T 3/40 | (2006.01) | |
| G08B 13/196 | (2006.01) | |
| H04N 5/232 | (2006.01) | |
| H04N 5/247 | (2006.01) | |
| H04N 21/214 | (2011.01) | |
| H04N 21/2365 | (2011.01) | |
| H04N 21/2665 | (2011.01) | |
| H04N 21/431 | (2011.01) | |
| H04N 21/434 | (2011.01) | |
| H04N 19/527 | (2014.01) | |

(52) U.S. Cl.
CPC .......... *G06T 3/4038* (2013.01); *G08B 13/1965* (2013.01); *G08B 13/19641* (2013.01); *G08B 13/19656* (2013.01); *G08B 13/19693* (2013.01); *H04N 5/2251* (2013.01); *H04N 5/23203* (2013.01); *H04N 5/23216* (2013.01); *H04N 5/23238* (2013.01); *H04N 5/23248* (2013.01); *H04N 5/23267* (2013.01); *H04N 5/247* (2013.01); *H04N 21/2146* (2013.01); *H04N 21/2365* (2013.01); *H04N 21/2665* (2013.01); *H04N 21/4312* (2013.01); *H04N 21/4314* (2013.01); *H04N 21/4347* (2013.01); *H04N 21/4348* (2013.01); *H04N 19/527* (2014.11)

(56) References Cited

U.S. PATENT DOCUMENTS

| | | | | |
|---|---|---|---|---|
| 2,841,063 | A | | 7/1958 | Park |
| 3,392,645 | A | | 7/1968 | Neasham |
| 3,518,929 | A | * | 7/1970 | Glenn, Jr. .................. 396/325 |
| 3,842,527 | A | * | 10/1974 | Low .............. 42/75.02 |
| 3,893,221 | A | * | 7/1975 | Lehmann ................... 29/453 |
| 3,896,463 | A | * | 7/1975 | Laskey .................... 396/544 |
| 3,901,707 | A | * | 8/1975 | Capute ..................... 430/359 |
| 4,162,745 | A | * | 7/1979 | Anderson, Jr. ............... 222/148 |
| 4,219,268 | A | | 8/1980 | Uchida |
| 4,797,942 | A | | 1/1989 | Burt |
| 4,877,085 | A | * | 10/1989 | Pullig, Jr. ................. 166/98 |
| 5,104,217 | A | * | 4/1992 | Pleitner et al. .............. 356/2 |
| 5,118,925 | A | * | 6/1992 | Mims et al. ............ 250/214 VT |
| 5,130,794 | A | | 7/1992 | Ritchey |
| 5,200,818 | A | | 4/1993 | Neta et al. |
| 5,276,321 | A | * | 1/1994 | Chang et al. ................. 250/226 |
| 5,317,394 | A | * | 5/1994 | Hale et al. ............... 348/207.99 |
| 5,426,476 | A | | 6/1995 | Fussell et al. |
| 5,611,769 | A | * | 3/1997 | Monroe ................. 600/112 |
| 5,790,181 | A | | 8/1998 | Chahl et al. |
| 5,831,619 | A | * | 11/1998 | Nakagawa et al. ........... 345/419 |
| 5,894,323 | A | * | 4/1999 | Kain et al. ................ 348/116 |
| 5,969,760 | A | * | 10/1999 | Ernest et al. ............... 348/357 |
| 6,052,539 | A | * | 4/2000 | Latorre .................. 396/263 |
| 6,141,034 | A | | 10/2000 | McCutchen |
| 6,226,418 | B1 | * | 5/2001 | Miller et al. ............... 382/294 |
| 6,522,325 | B1 | * | 2/2003 | Sorokin et al. ............. 345/427 |
| 6,928,194 | B2 | * | 8/2005 | Mai et al. ................. 382/284 |
| 6,933,966 | B2 | * | 8/2005 | Taylor ................... 348/159 |
| 6,947,059 | B2 | * | 9/2005 | Pierce et al. .............. 345/629 |
| 6,954,310 | B2 | * | 10/2005 | Holloway et al. ............ 359/619 |
| 6,954,319 | B2 | | 10/2005 | Yanagita et al. |
| 6,980,249 | B2 | * | 12/2005 | Albertelli ................ 348/335 |
| 7,307,663 | B2 | * | 12/2007 | Pokrovsky et al. ........... 348/373 |
| 7,365,774 | B2 | * | 4/2008 | Louis .................... 348/219.1 |
| 7,429,997 | B2 | * | 9/2008 | Givon ................... 348/46 |
| 2002/0122113 | A1 | * | 9/2002 | Foote .................... 348/48 |
| 2002/0163582 | A1 | * | 11/2002 | Gruber et al. ............. 348/218.1 |
| 2003/0106971 | A1 | | 6/2003 | Leyden et al. |
| 2004/0041914 | A1 | * | 3/2004 | Peters, III ............... 348/207.99 |
| 2004/0057633 | A1 | * | 3/2004 | Mai et al. ................. 382/284 |
| 2004/0076340 | A1 | | 4/2004 | Nielsen |
| 2004/0085450 | A1 | * | 5/2004 | Stuart .................. 348/156 |
| 2004/0167709 | A1 | | 8/2004 | Smitherman et al. |
| 2004/0207726 | A1 | * | 10/2004 | McCutchen .............. 348/46 |
| 2005/0068632 | A1 | | 3/2005 | Holloway et al. |
| 2005/0077450 | A1 | | 4/2005 | Baer |
| 2005/0270387 | A1 | | 12/2005 | Watanabe et al. |
| 2007/0047942 | A1 | * | 3/2007 | Chang et al. ............... 396/133 |

FOREIGN PATENT DOCUMENTS

| | | |
|---|---|---|
| EP | 1 359 554 | 11/2003 |
| EP | 1 422 946 | 5/2004 |
| EP | 1 463 325 | 9/2004 |
| JP | 2000-188747 | 7/2000 |
| JP | 2001-094857 | 4/2001 |
| JP | 2001-145093 | 5/2001 |
| JP | 2001-333379 | 11/2001 |
| JP | 2002-500989 | 1/2002 |
| JP | 2002-330431 | 11/2002 |
| JP | 2002-354474 | 12/2002 |
| JP | 2003-023553 | 1/2003 |
| JP | 2004-186922 | 7/2004 |
| JP | 2004-342252 | 12/2004 |
| JP | 2005-064906 | 3/2005 |
| JP | 2005-080015 | 3/2005 |
| JP | 2005-283756 | 10/2005 |
| JP | 2005-538394 A | 12/2005 |
| JP | 2006-14291 | 1/2006 |
| JP | 2006-025105 | 1/2006 |
| JP | 2006 025340 A | 1/2006 |
| JP | 2006-518127 | 8/2006 |
| WO | WO 98/47291 A2 | 10/1998 |
| WO | WO 02/06892 A2 | 1/2002 |
| WO | WO 03/021187 A2 | 3/2003 |
| WO | WO 2005/076620 | 1/2005 |

OTHER PUBLICATIONS

Invitation to Pay Additional Fees dated Feb. 20, 2008, for corresponding International Application No. PCT/US2007/062070 (4 pages).
International Search Report and Written Opinion dated Jun. 9, 2008, for corresponding International Application No. PCT/US2007/062070 (16 pages).
The Patent Office of the People's Republic of China, Notification of the First Office Action, Apr. 1, 2010 for corresponding Chinese Application No. 200780012738.8 (16 pages).
English Translation of a Second Office Action in Chinese Patent Application No. 200780012738.3, mailed by the State Intellectual Property Office of the People's Republic of China on May 20, 2011 (8 pages).
An English translation of a Rejection Decision in Patent Application No. 200780012738.8, mailed by the State Intellectual Property Office of the People's Republic of China on Mar. 9, 2012 (6 pages).
A Communication pursuant to Article 94(3) EPC, issued by the European Patent Office on Feb. 24, 2012, in European Patent Application No. 07756929.1-2216 (8 pages).
A communication in Japanese Patent Application No. 2008-554546 issued by the Japan Patent Office on Feb. 7, 2012 (3 pages).
An English translation of a Decision of Rejection mailed by the Japan Patent Office on Dec. 4. 2012, in Japanese Patent Application No. JP 2008-554546 (2 pages).
An Extended European Search Report issued by the European Patent Office on Apr. 9, 2014, in European Patent Application No. 14156240.5 (7 pages).
A Communication pursuant to Article 94(3) EPC issued by the European Patent Office on Jan. 31, 2014, in European Patent Application No. 07 756 907.7 (11 pages).
Szeliski, "Image Alignment and Stitching: A Tutorial," Technical Report MSR-TR-2004-92, Jan. 26, 2005 (72 pages).
A Notice of Reasons of Rejection mailed by the Japan Patent Office on Nov. 5, 2013, in Japanese Patent Application No. JP 2008-554543 (4 pages).

* cited by examiner

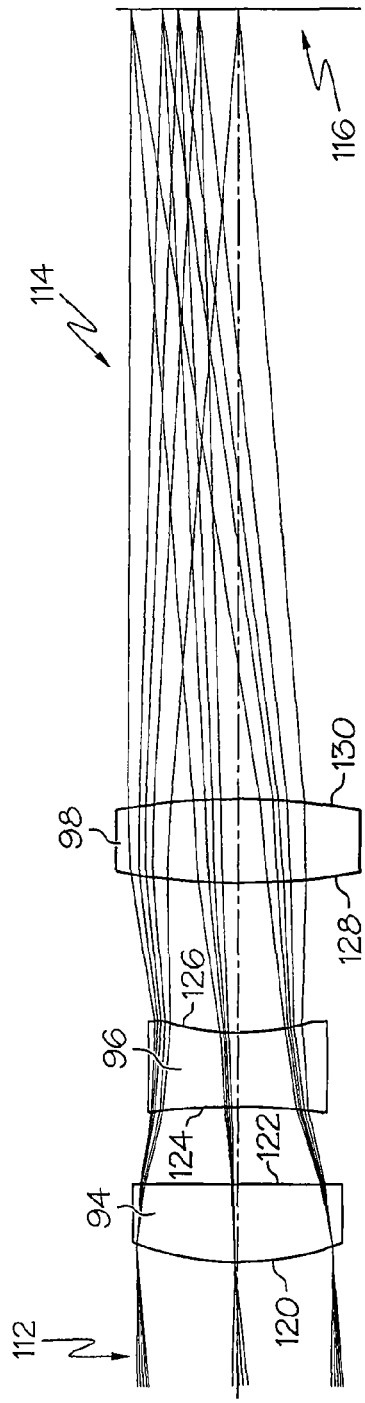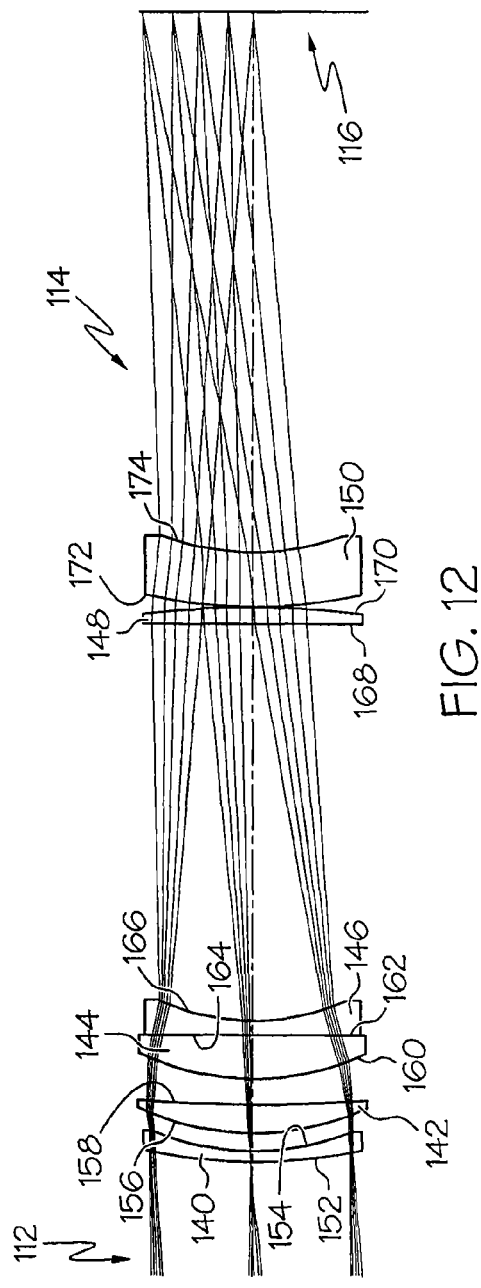

MULTI-LENS ARRAY SYSTEM AND METHOD

PRIORITY

This application claims priority to U.S. Provisional Patent Application Ser. No. 60/772,670, entitled "Multi-Lens Array System and Method," filed Feb. 13, 2006, the disclosure of which is incorporated by reference herein.

STATEMENT REGARDING FEDERALLY SPONSORED RESEARCH OR DEVELOPMENT

This invention was made with Government support under DARPA Contract No. NBCHC050090 awarded by the U.S. Department of the Interior—National Business Center on behalf of a Department of Defense Agency—Defense Advanced Research Projects Agency. The Government has certain rights in the invention.

BACKGROUND

Image capture systems have existed in a variety of forms since the inception of photography. One type of image capture system includes an array of cameras used to capture several images that are stitched together to form a single unitary image or a composite image. While a variety of methods and apparatuses for capturing images have been made and used, it is believed that no one prior to the inventors has made or used the invention described in the appended claims.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

FIG. 11 depicts light passing through lens elements of the lens assembly of FIG. 9;

FIG. 12 depicts light passing though exemplary alternative lens elements suitable for use in the lens assembly of FIG. 9;

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

Figure 1:
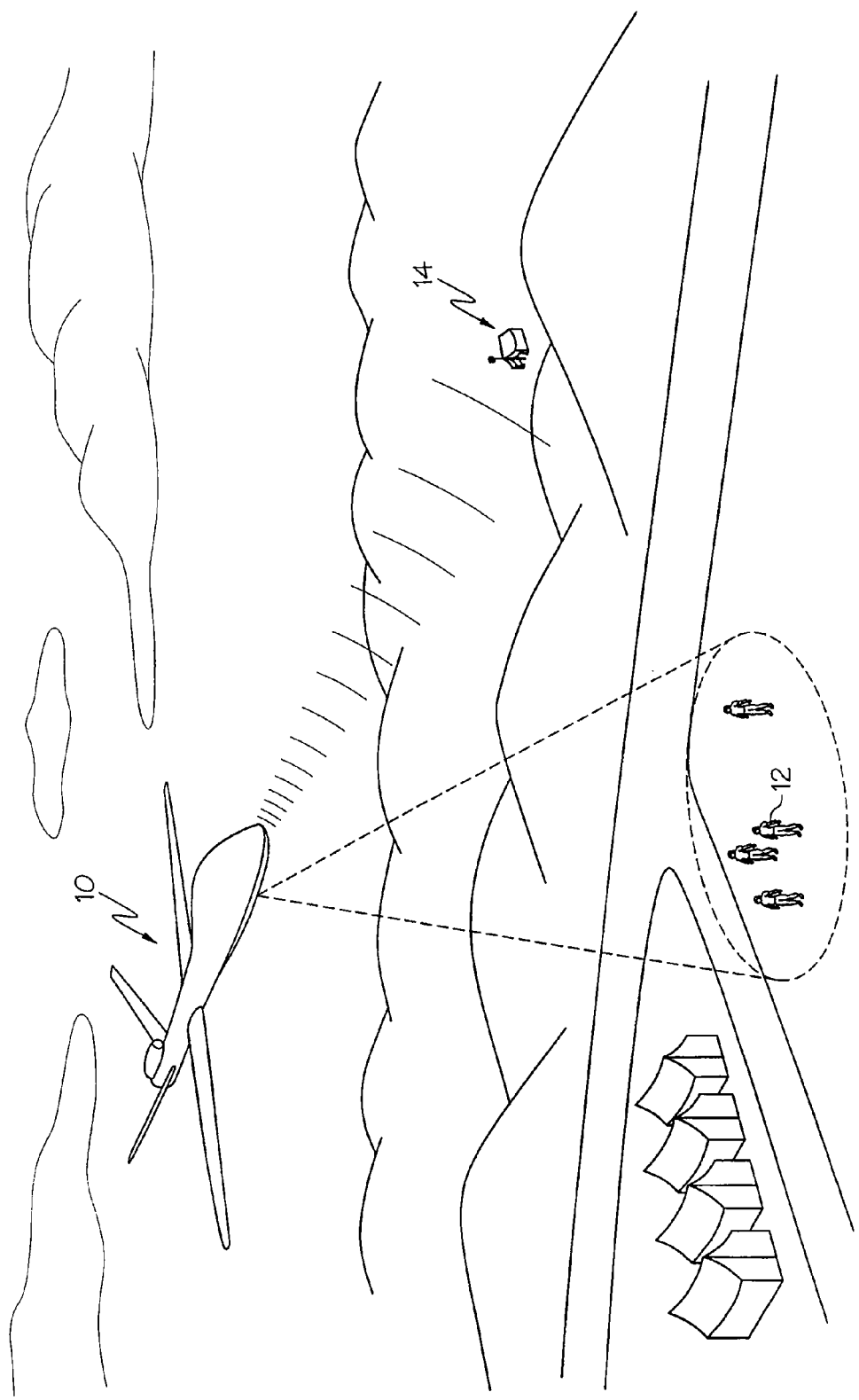
FIG. 1 depicts an exemplary image capture and transmission system.
Figure 2:
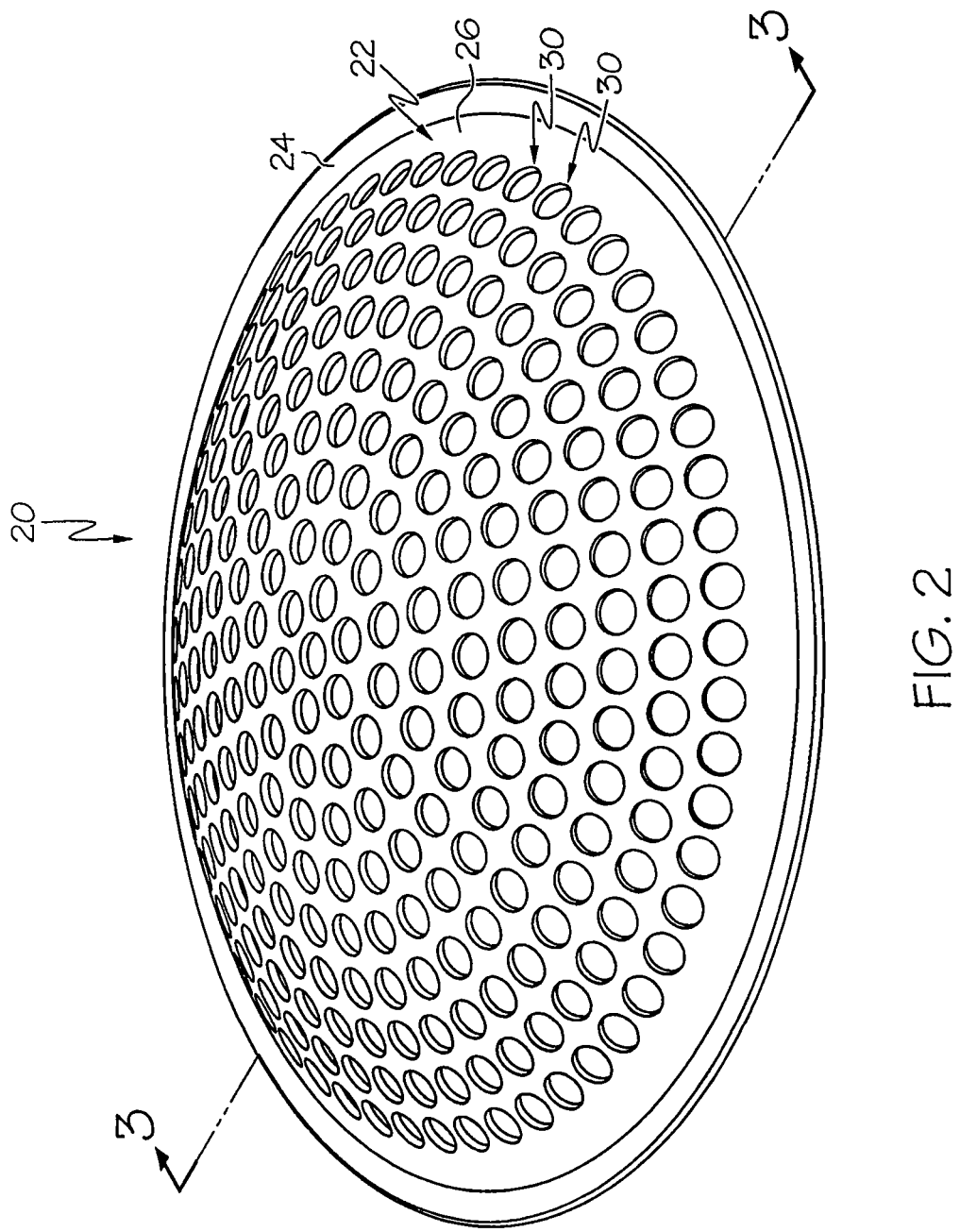
FIG. 2 depicts a perspective view of an exemplary mount for an array of cameras.
Figure 3:
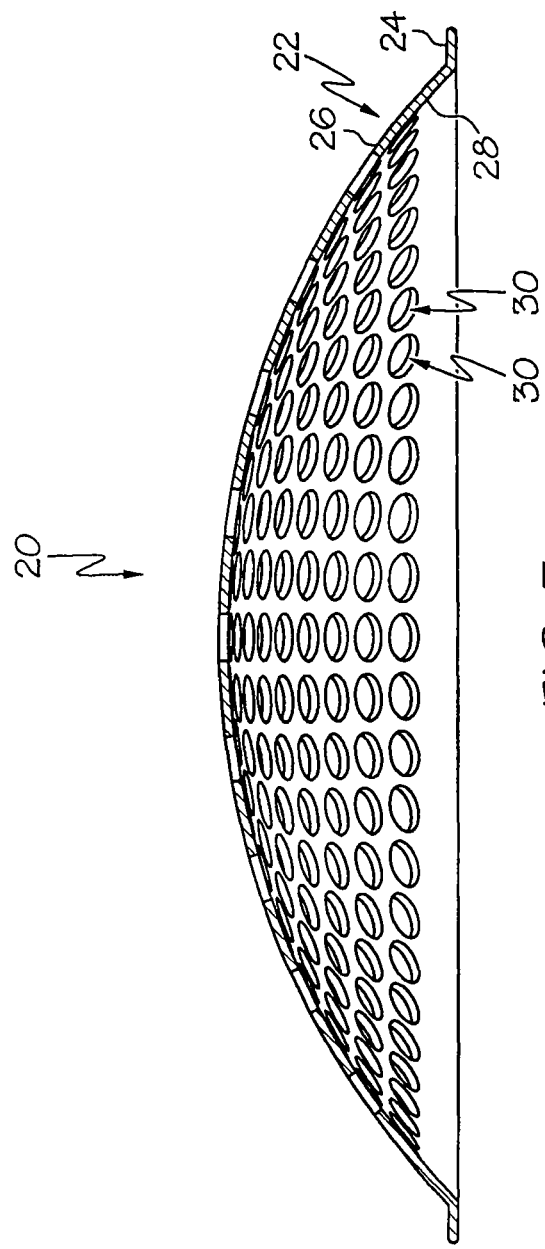
FIG. 3 depicts a cross-sectional view of the mount of FIG. 2, taken along line 3-3.
Figure 4:
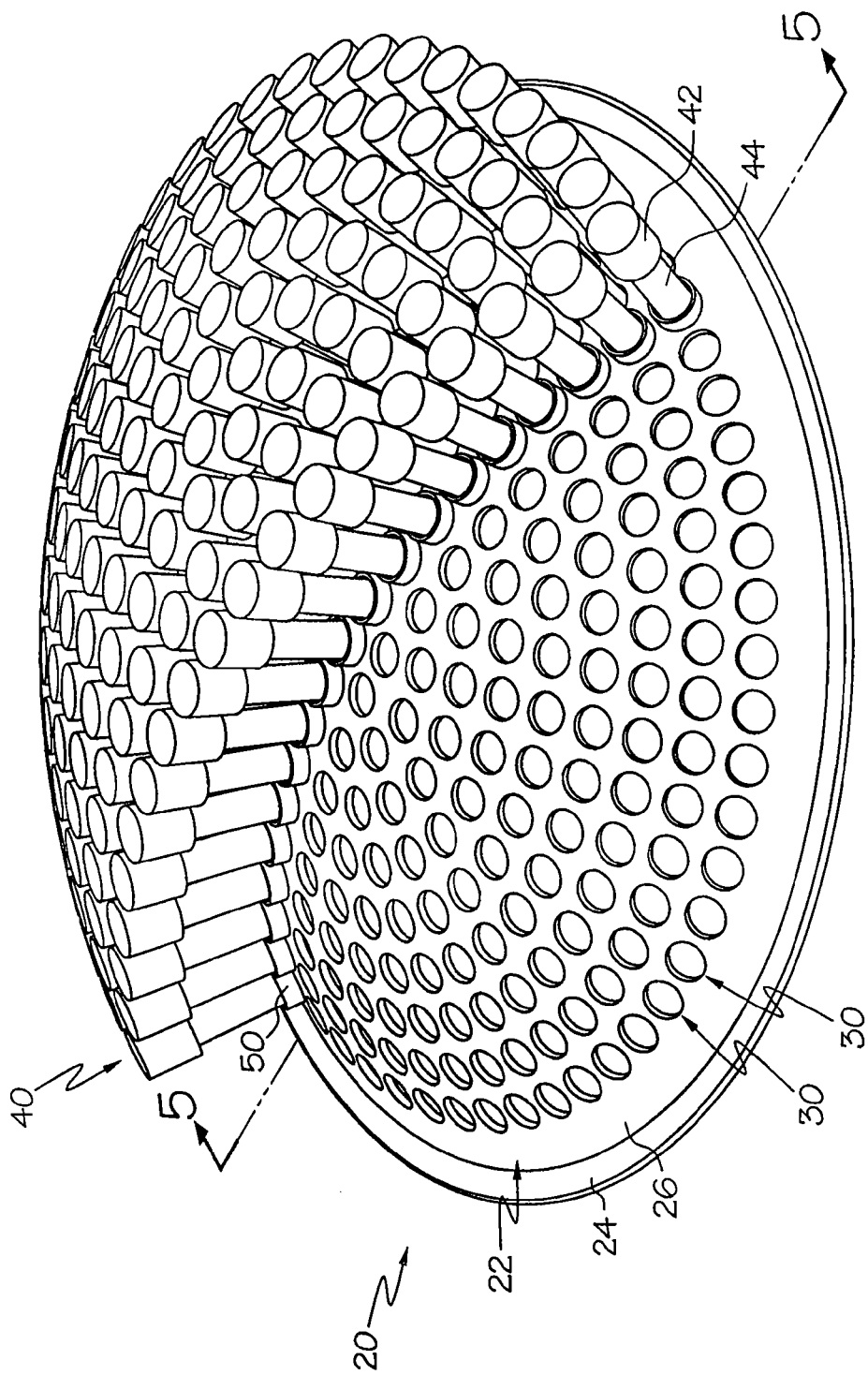
FIG. 4 depicts a perspective view of the mount of FIG. 2 with a plurality of cameras mounted thereto.
Figure 5:
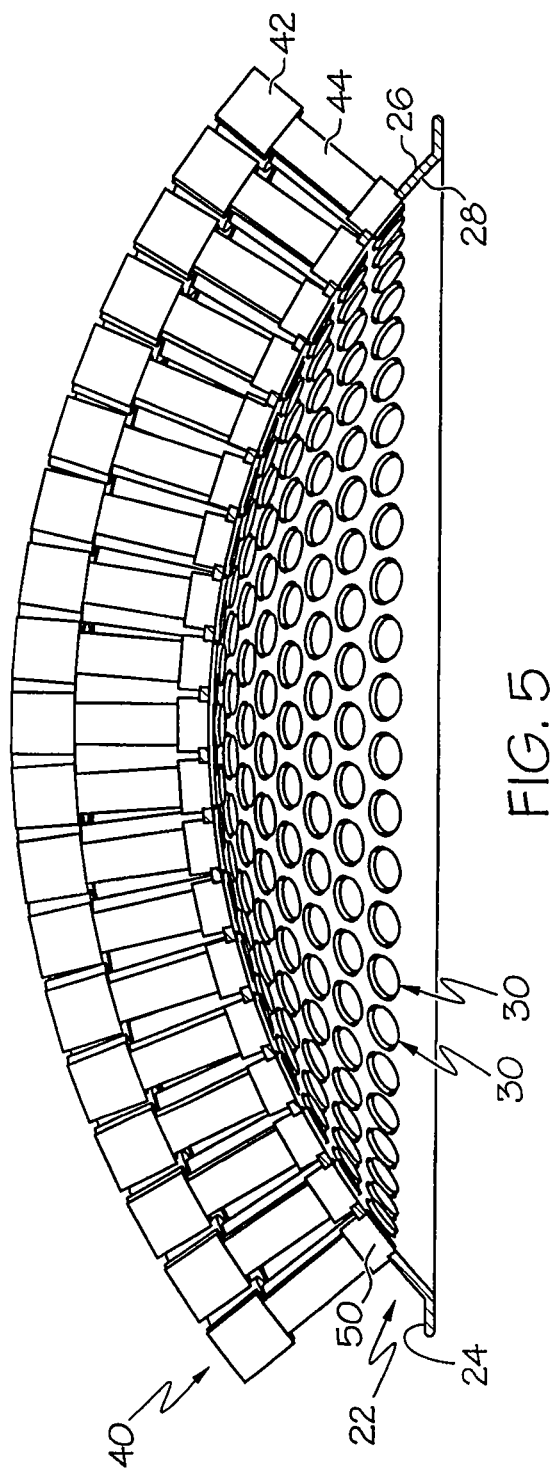
FIG. 5 depicts a cross-sectional view of the mount of FIG. 4, taken along line 5-5.

As shown in FIG. 1, and as will be described in greater detail below, the image capture system of the present example employs the use of an aircraft (10) for the capture of overhead, wide-angle video images of people (12), facilities, cities, or other places or things within the field of view of the image capture system. At least a portion of the captured images are transmitted in approximately real time to a ground station (14). While not depicted, a plurality of ground stations (14) may be provided, with at least one ground station (14) acting as a relay between other ground stations (14) and aircraft (10).

While aircraft (10) depicted in FIG. 1 is an unmanned drone, it will be appreciated that any other type of aircraft (10) may be used, including but not limited to a manned airplane, a helicopter, an airship, a balloon, or another type of aerostat. It will also be appreciated that an image capture system may be used in any other type of vehicle, including but not limited to land vehicles, watercraft, etc. Alternatively, an image capture system may be secured to a structure in a fixed location, such as a tower, building, etc. An image capture system may also include a combination of image capturing portions in an aircraft or other vehicle and image capturing portions secured to a fixed location. While several examples herein contemplate an image capture system being oriented vertically, such that its view is directed generally downward, it will be appreciated that image capture systems described herein may also be oriented horizontally or provided in any other suitable orientation. Other ways in which an image capture system may be provided and used will be apparent to those of ordinary skill in the art.

As shown in FIGS. 2-5, the image capture system of the present example comprises a camera mount (20) or optical bench. Camera mount (20) may comprise acrylic, polycarbonate, or any other plastic, aluminum or any other metal, or any other material(s), including combinations thereof. As shown, camera mount (20) has a dome-like convex portion (22), and a lip (24), which defines a circumference of camera mount (20) and extends radially outward. Alternatively, lip (24) may have any suitable angle or other configuration. By way of example only, lip (24) may have an inner diameter between approximately 46", inclusive, and approximately 48", inclusive; and an outer diameter between approximately 48", inclusive, and approximately 50", inclusive. Alternatively, any other inner or outer diameter may be used.

Convex portion (22) has an outer surface (26) and an inner surface (28), and a plurality of openings (30) formed therethrough. In the present example, convex portion (22) has 271 openings (30), each being configured to receive a camera (40). It will be appreciated, however, that any suitable number of openings (30) may be used, including but not limited to less than 100, more than 100, more than 200, more than 300, or any other suitable number. Each opening (30) of the present example has a diameter of approximately 38 mm, though any other diameter may be used. By way of example only, convex portion (22) may have an inside radius of curvature between approximately 24", inclusive, and approximately 26", inclusive; and an outside radius of curvature between approximately 24.125", inclusive, and approximately 26.125", inclusive. Convex portion (22) of the present example has an inside radius of curvature of approximately 24", and an outside radius of curvature of approximately 24.125". Alternatively, any other inside or outside radius of curvature may be used. In another embodiment, convex portion (22) has a hyperbolic or parabolic curvature. Other suitable configurations will be apparent to those of ordinary skill in the art.

In another embodiment, camera mount (20) is generally flat. In this embodiment, each camera (40) may be aimed at a common phantom point or may be otherwise oriented. In other words, where camera mount (20) is generally flat, the lines of sight of cameras (40) may nevertheless intersect in a manner similar to that described herein with respect to the curved camera mount (20), and such lines of sight may have relative angular relationships similar to those described herein with respect to the curved camera mount. In still another embodiment, cameras (40) are provided in a variety of sizes. For instance, a relatively large camera (40) may be provided in the center of an array of relatively smaller cameras (40). Similarly, several cameras (40) may be provided with different optical properties or other differing properties. It will therefore be appreciated that all cameras (40) mounted to camera mount (20) need not be uniformly the same.

Figure 6:
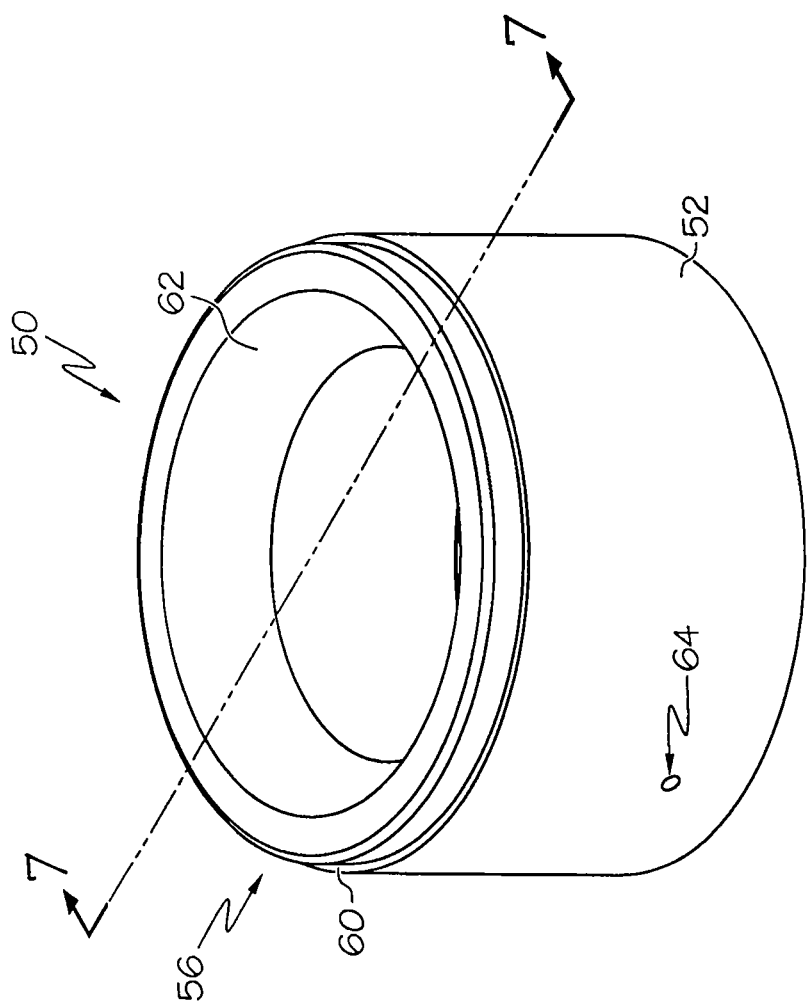
FIG. 6 depicts a perspective view of an exemplary collar suitable for securing a camera to the mount of FIG. 2.
Figure 7:
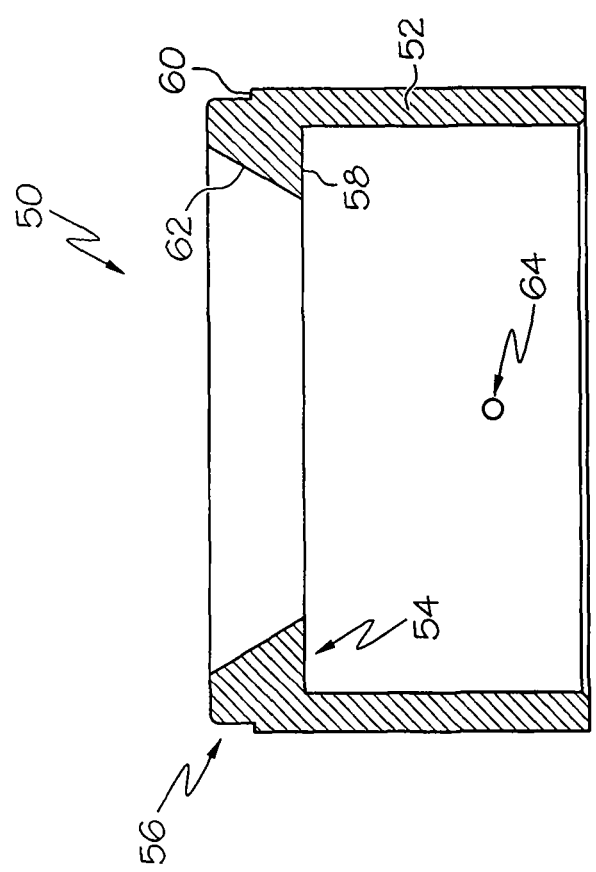
FIG. 7 depicts a cross-sectional view of the collar of FIG. 6.

Each camera (40) of the present example comprises a sensor portion (42) and a lens portion (44), which will be described in greater detail below. Cameras (40) are positioned on convex portion (22) of camera mount (20) such that each lens portion (44) is oriented radially inward. It will therefore be appreciated that, where a plurality of cameras (40) are secured to camera mount (20), lens portions (44) of cameras (40) will have intersecting lines of sight. Each lens portion (44) of the present example is secured to convex portion (22) by a respective collar (50), an example of which is shown in FIGS. 6 and 7. As shown, each collar (50) has a sidewall (52), an inner recessed portion (54), and an outer recessed portion (56). Each sidewall (52) has a plurality of threaded openings (64) formed therethrough. Inner recessed portion (54) has an inner shoulder (58) extending radially inward; while outer recessed portion (56) has an outer shoulder (60) extending radially outward. As is also shown, collar (50) comprises an angled portion (62) that defines a frusto-conical aperture. Angled portion (62) is adjacent to inner shoulder (58), and defines an angle of approximately 60° relative to inner shoulder (58). Of course, any other suitable orientation or configuration may be used.

In another embodiment, a pan-tilt-zoom (PTZ) camera (not shown) is used in combination with cameras (40). Such a PTZ camera may be mounted to the same platform as cameras (40). In addition, or in the alternative, a PTZ camera may be located elsewhere. As yet another variation, a camera system such as one described in U.S. Pub. No. 2006/0028550, entitled "Surveillance System and Method," the disclosure of which is incorporated by reference herein, is used in combination with cameras. As with the PTZ camera described above, such a camera system may be generally co-located with cameras (40) and/or may be located elsewhere. Other cameras or camera systems that may be suitable for combining with cameras (40) will be apparent to those of ordinary skill in the art.

In the present example, collars (50) are secured to camera mount (20) by inserting outer recessed portion (56) of each collar (50) into a respective opening (30), such that outer shoulder (60) is adjacent to outer surface (26) of convex portion (22). It will be appreciated that this may be repeated until every opening (30) has a corresponding collar (50) inserted therein. In one embodiment, collars (50) are secured to convex portion (22) using an adhesive or epoxy. In another embodiment, outer recessed portions (56) and openings (30) are threaded, such that collars (50) may be screwed into openings (30). Still other ways in which collars (50) may be secured to camera mount (20) will be apparent to those of ordinary skill in the art, including but not limited to welding, interference fitting, or any other techniques. Alternatively, camera mount (20) may be constructed such that collars (50), or structures similar thereto, are integrally formed with camera mount (20). Of course, any other techniques or structures for securing cameras (40) to camera mount (20) may be used. In other words, collars (50) such as those described herein are merely optional.

Before or after collars (50) are secured to camera mount (20), lens portions (44) are inserted into collars (50) and secured thereto. In particular, a lens portion (44) is inserted into each collar (50) such that the distal or objective end of lens portion (44) is adjacent inner shoulder (58). Each lens portion (44) is then secured to its corresponding collar (50) by inserting and tightening a set screw (not shown) into threaded openings (64) formed through sidewall (52) of collar (50). It will be appreciated that lens portion (44) may be any commercial off-the-shelf (COTS) lens assembly, and that each camera (40) may be a COTS camera. The use of set screws or other devices may permit collar (50) to accommodate and secure various types of lens portions (44) having various outer diameters.

Alternatively, the inside of sidewall (52) may be threaded, such that lens portion (44) may be screwed into collar (50). Still other suitable structures and techniques for securing lens portion (44) to collar (50) will be apparent to those of ordinary skill in the art. Alternatively, lens portion (44) may be configured such that a structure similar to collar (50) is integrally formed therewith. It will therefore be appreciated that collar (50), as a piece separate from lens portion (44), is merely optional, as are other components described herein.

Figure 8:
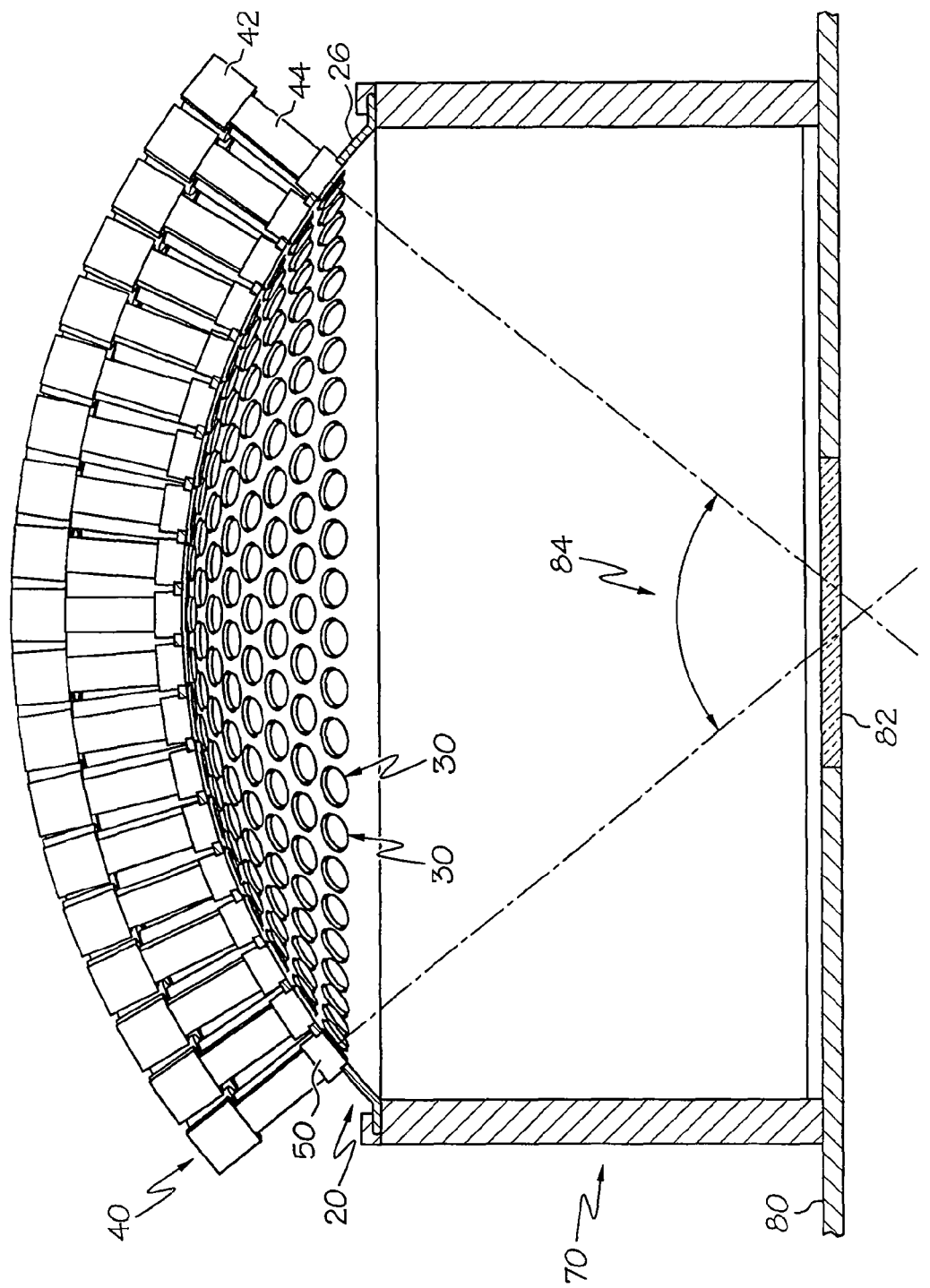
FIG. 8 depicts a cross-sectional view of the mount of FIG. 2 secured to a fuselage.

FIG. 8 shows camera mount (20) secured to the fuselage (80) of aircraft (10) by a fixture (70). In one embodiment, fixture (70) comprises a "Pictorvision XR" structure by Pictorvision Inc. (formerly Wescam), of Van Nuys, Calif. Of course, any other type of fixture (70) may be used. It will also be appreciated that fixture (70) may have any of a variety of properties. For instance, fixture (70) may be substantially rigid, such that fixture (70) prohibits movement of camera mount (20) relative to fuselage (80). Alternatively, fixture (70) may comprise gimbal features or similar features, permitting some degree of movement of camera mount (20) relative to fuselage (80). It will also be appreciated that fixture (70) may comprise pads, cushions, resilient members, etc., configured to provide dampening, or other features configured to prevent transfer of vibrations from fuselage (80) to camera mount (20). Still other suitable features and configurations for fixture (70) will be apparent to those of ordinary skill in the art.

In the present example, window (82) is provided in fuselage (80), permitting cameras (40) to "see" through fuselage (80). In other words, each camera (40) is oriented such that all cameras (40) point through a common central aperture provided by window (82). More particularly, cameras (40) of the present example have intersecting lines of sight. As shown in FIG. 8, the intersecting lines of sight of the outermost cameras (40) form a maximum convergence angle (84). The vertex of this angle (84) may be regarded as a "phantom point." While the lines of sight of the outermost cameras (40) are shown as converging generally at window (82), it will be appreciated that these lines of sight may converge elsewhere (e.g., above window (82), below window (82), etc.). Beyond the point at which the lines of sight converge, the lines of sight diverge through what may be regarded as a region of divergence. In the present example, subjects (e.g., persons, places, objects, events, etc.), of which images are captured by cameras (40), are located within this region of divergence. In other words, the "phantom point" is positioned between cameras (40) and the subject of which images are being captured. Alternatively, the lines of sight may converge approximately at the subject. As yet another alternative, the subject may be positioned such that the subject is located between cameras (40) and the "phantom point."

In the present example, window (82) is substantially flat on both sides, though it will be appreciated that either or both sides of window (82) may be curved, such that window (82) may be provided as a lens element. Similarly, while window (82) of the present example has a diameter of approximately 202.9 mm, it will be appreciated that any other suitable diameter or dimension(s) may be used.

In one embodiment, maximum convergence angle (84) is approximately 92°. In another embodiment, the maximum convergence angle (84) is approximately 81°. Of course, any other suitable maximum convergence angle (84) may be used. Alternatively, camera mount (20) may be configured or used such that the lines of sight of the outermost cameras (40) do not converge. It will also be appreciated that maximum convergence angle (84) may vary as a function of the radius of curvature of convex portion (22) of camera mount (20), and/or a variety of other factors. Those of ordinary skill in the art will also recognize that the field of view obtained by cameras (40), collectively, may be proportional to the maximum convergence angle (84) or have some other relationship with the maximum convergence angle (84). Alternatively, the field of view collectively obtained by cameras (40) may be disproportional to the maximum convergence angle (84).

It will be appreciated that, to the extent that camera mount (20) is secured to a moving platform (e.g., aircraft (10)), images captured by cameras (40) may have a tendency to jitter or may otherwise be affected by motion of the platform. Such effects may addressed by stabilizing camera mount (20) relative to the platform and/or by stabilizing cameras (40) relative to camera mount (20). For instance, a dampening structure or feature may be incorporated into or between cameras (40), camera mount (20), fixture (70), and/or elsewhere. As noted above, such a dampening structure or feature may comprise any number of the following: springs, rubber or foam pads, pneumatics, gimbals, etc. In addition, different components of an image capture system may be dampened in different ways, if at all. Other dampening techniques, as well as alternatives to dampening, will be apparent to those of ordinary skill in the art.

Alternatively, effects of platform movement, vibration, etc., on images captured by cameras (40) may be addressed through processing of the images. Such "corrective" processing may be performed in addition to or in lieu of the hardware-based techniques described above for addressing similar effects. For instance, as will be described in greater detail below, images captured by cameras (40) may be combined to form a collective, wide angle image, such that an image captured by a single camera (40) may be regarded as a "tile" of the larger image. As will also be described in greater detail below, mosaicking techniques may be used to eliminate motion between such tiles (e.g., motion or translation of one tile relative to another tile); while global motion estimation may be used to address motion of the collective, wide angle image. In other words, mosaicking may be used to address motion of cameras (40) relative to each other, while global motion estimation may be used to address collective motion of cameras (40) relative to the ground.

Figure 9:
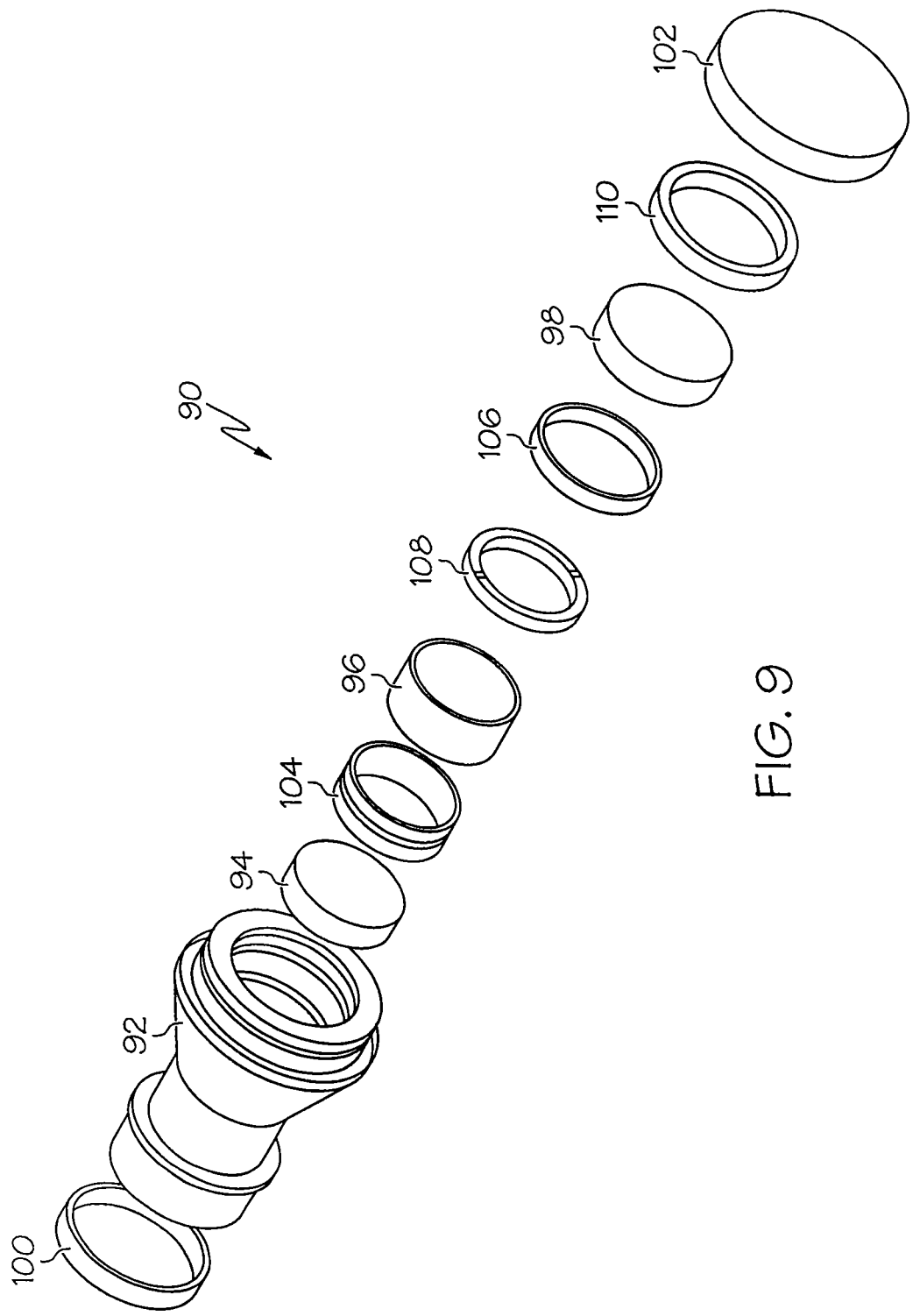
FIG. 9 depicts an exploded view of an exemplary lens assembly.
Figure 10:
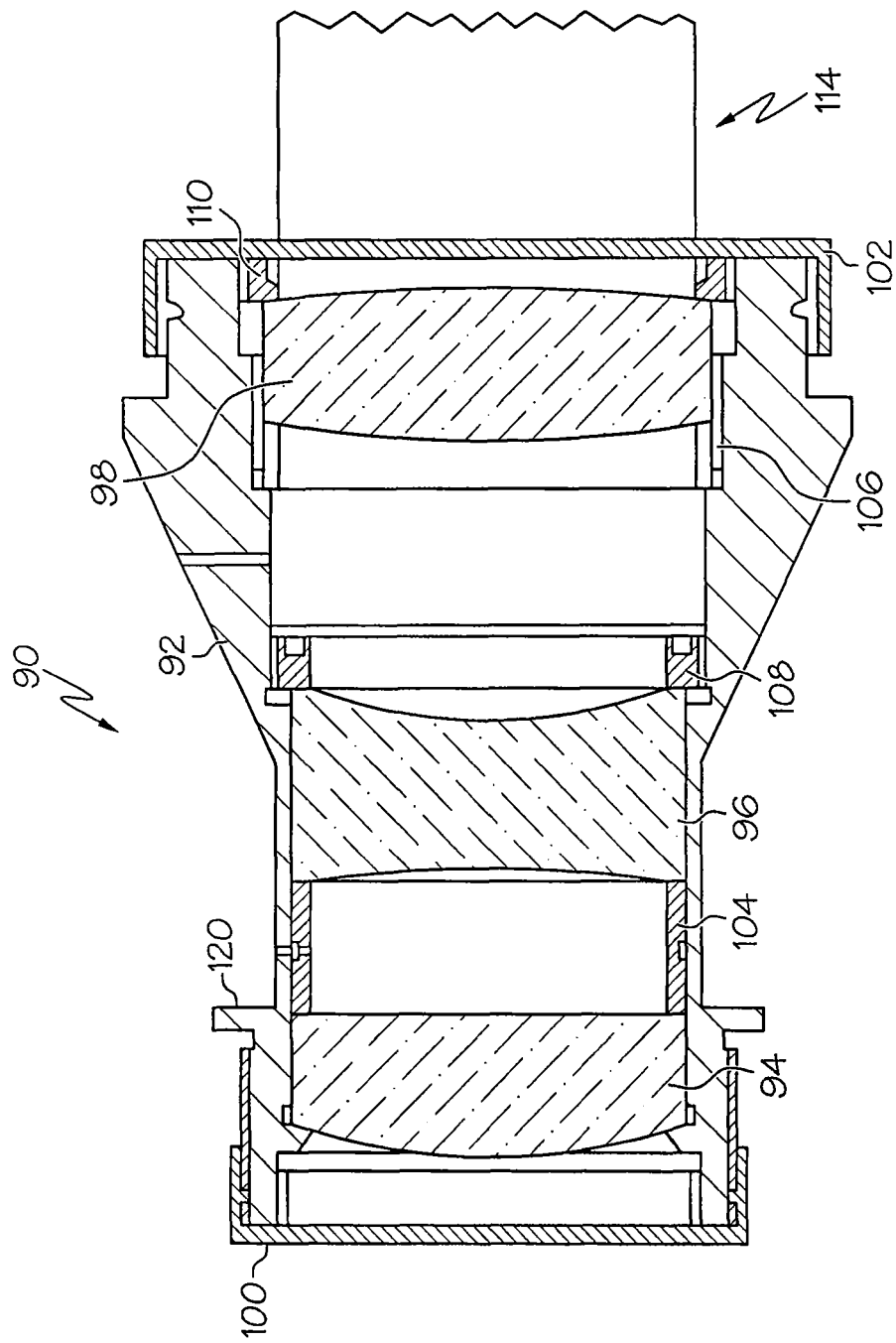
FIG. 10 depicts a cross-sectional view of the lens assembly of FIG. 9.

An exemplary lens assembly (90) is illustrated in FIGS. 9-11. In one embodiment, lens portion (44), described above, comprises lens assembly (90). As shown, and as will be described in greater detail below, lens assembly (90) comprises a housing (92) or barrel, a plurality of lens elements (94, 96, 98), caps (100, 102), spacers (104, 106), and retainers (108, 110). A circumferential flange (120) extends radially outward near the objective end of lens assembly (90).

In this example, lens assembly (90) is configured such that front lens element (94) is positioned distally (e.g., at the objective end of lens assembly (90)), rear lens element (98) is positioned proximally, and middle lens element (96) is positioned between front lens element (94) and rear lens element (98). It will be appreciated that lens portion (44) may comprise one or more features providing the option of taking lens portion (44) apart for any purpose. For instance, housing (92) of lens assembly (90) may be configured in separate parts having complimentary threaded features, such that housing (92) may be taken apart by unscrewing these parts from each other. Other ways in which housing (92) may be varied will be apparent to those of ordinary skill in the art.

As illustrated in FIGS. 10 and 11, lens assembly (90) is configured such that light (112) passes through front lens element (94) first, then through middle lens element (96), then through rear lens element (98). This provides an image projection (114) to an image plane (116). In the present example, when lens assembly (90) is coupled with sensor portion (42), sensor portion (42) is located within image plane (116), such that image projection (114) is received by sensor portion (42). While several exemplary features of lens elements (94, 96, 98) will be described below, it will be appreciated that lens elements (94, 96, 98) may have any other suitable configurations, and that any number or types of lens elements may be used.

Front lens element (94) comprises a convex first surface (120) and a substantially flat second surface (122). Convex first surface (120) has a radius of curvature of approximately 48.785 mm, though any other suitable radius of curvature may be used. Similarly, second surface (122) need not necessarily be substantially flat, and may have any suitable radius of curvature. For instance, second surface (122) may be slightly concave. In the present example, front lens element (94) comprises a SCHOTT SK16 glass. Alternatively, any other suitable glass may be used.

Middle lens element (96) is biconcave, and comprises a concave first surface (124) and a concave second surface (126). Concave first surface (124) has a radius of curvature of approximately 135.35 mm; while concave second surface (126) has a radius of curvature of approximately 41.107 mm. Of course, any other suitable radius of curvature may be used for either or both of concave first surface (124) or concave second surface (126). In the present example, middle lens element (96) comprises a SCHOTT F4 glass. Alternatively, any other suitable glass may be used.

Rear lens element (98) comprises a convex first surface (128) and a convex second surface (130). Convex first surface (128) has a radius of curvature of approximately 115.24 mm; while convex second surface (128) has a radius of curvature of approximately 193.241 mm. Of course, any other suitable radius of curvature may be used for either or both of convex first surface (128) or convex second surface (130). In the present example, rear lens element (98) comprises a SCHOTT SK16 glass. Alternatively, any other suitable glass may be used.

FIG. 12 depicts a series of alternative lens elements (140, 142, 144, 146, 148, 150). In this example, first lens element (140) comprises a convex first surface (152) and a concave second surface (154). Second lens element (142) comprises a convex first surface (156) and a substantially flat second surface (158). Third lens element (144) comprises a convex first surface (160) and a substantially flat second surface (162). Fourth lens element (146) comprises a substantially flat first surface (164) and a concave second surface (166). In this example, third and fourth lens elements (144, 146) are positioned such that substantially flat first surface (164) of fourth lens element (146) is adjacent substantially flat second surface (162) of third lens element (144). Fifth lens element (148) comprises a substantially flat first surface (168) and a convex second surface (170). Sixth lens element (150) comprises a convex first surface (172) and a concave second surface (174). In this example, fifth and sixth lens elements (148, 150) are positioned such that convex first surface (168) of sixth lens element (150) is adjacent convex second surface (170) of fifth lens element (148). Of course, these configurations for lens elements (140, 142, 144, 146, 148, 150) are merely exemplary, and any number of lens elements or lens element configurations may be used.

Figure 13:
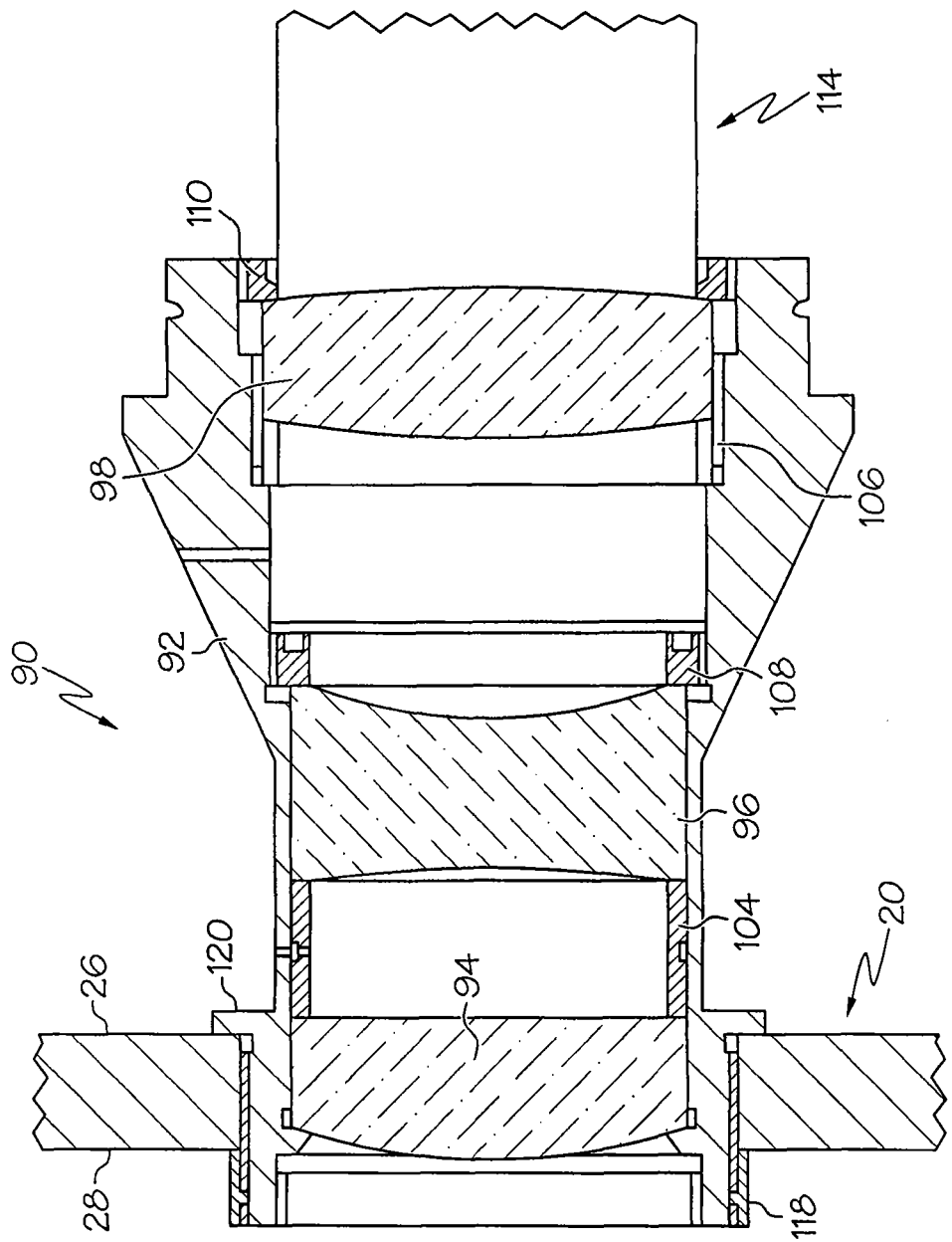
FIG. 13 depicts a partial cross-sectional view of the lens assembly of FIG. 9 mounted to the mount of FIG. 2.

FIG. 13 shows an example of how lens assembly (90) may be secured to camera mount (20). As shown, a portion of the objective end of lens assembly (90) is inserted through camera mount (20), such that the circumferential flange (120) of lens assembly (90) is adjacent outer surface (26) of camera mount (20). A securing ring (118) is engaged with the objective end of lens assembly (90), and is adjacent inner surface (28) of camera mount (20). Securing ring (118) and circumferential flange (120) thus "sandwich" camera mount (20), thereby securing lens assembly (90) to camera mount (20) in a clamping fashion. Other suitable methods for securing a lens assembly (90) or camera (40) to camera mount (20) will be apparent to those of ordinary skill in the art.

Each camera (40) of the present example has the following parameters, each being merely approximate in value: an F-number of 6; an effective focal length of 180 mm; an image distance of 124 mm; an image size of 2048×2048 pixels (or 24×24 mm); a spectral range of 450-700 nm; a length of 200 mm; a field of view of 10.8°; an entrance pupil diameter of 30 mm; a depth of field ranging from 1.5 km to infinity; and a pixel pitch of 12 microns. Of course, each of these listed parameter values is merely exemplary, and any other suitable parameter values may be used. For instance, cameras (40) may have a spectral range falling anywhere between approximately 300 and approximately 30,000 nm, inclusive. In one embodiment, an image formed by combining images captured substantially simultaneously with cameras (40) comprises approximately one billion pixels, such that cameras (40) collectively form a single "gigapixel camera."

In the present example, each sensor portion (42) comprises a sensor element (not shown) that is operable to capture visible light (e.g., having a wavelength between approximately 450 nanometers and approximately 700 nanometers). Each sensor portion (42) may comprise a CCD sensor (e.g., frame transfer, interline transfer, etc.), a CMOS sensor (e.g., with an electronic rolling shutter), or any other type of sensor. By way of example only, sensor portion (42) may comprise a LUPA 4000 sensor by Cypress Semiconductor Corporation of San Jose, Calif., though any other sensor may be used. In one embodiment, cameras (40) are configured to obtain monochrome images. In another embodiment, cameras (40) are configured to obtain polychrome images. In yet another variation, sensor portions (42) comprise infrared imaging components, such that cameras (40) comprise infrared cameras. Infrared cameras (40) may comprise passive night vision components, active night vision components, or combinations thereof. In still another variation, a cameras (40) is operable to capture both infrared and non-infrared images.

Sensor portions (42) of the present example are configured to provide a global shutter. In other words, cameras (40) are configured to all capture images substantially simultaneously and synchronously. It will be appreciated that a global shutter may be provided mechanically and/or electronically. For instance, a mechanical or electronic global shutter may cause the exposure time for each camera (40) to begin and end at substantially the same time as the other cameras (40). Suitable techniques for implementing a global shutter will be apparent to those of ordinary skill in the art. It will also be appreciated that a global shutter is not necessary, and that any suitable alternative may be used. By way of example only, an algorithm may be used to register pixels to a common time. Suitable methods of implementing such an algorithm will be apparent to those of ordinary skill in the art, as will other alternatives to a global shutter.

Sensor portions (42) may be secured to corresponding lens portions (44) in any suitable way. For instance, sensor portions (42) and lens portions (44) may comprise complimentary threaded features, such that a sensor portion (42) may be screwed on to a corresponding lens portion (44). Alternatively, sensor portion (42) may be configured to clasp or latch onto a corresponding lens portion (44). As yet another alternative, instead of being removably coupled with a corresponding lens portion (44), a sensor portion (42) may be permanently coupled with a corresponding lens portion (44), such as by welding, using adhesives, integral formation, or using other techniques. Other suitable structural relationships between lens portion (44) and sensor portion (42) will be apparent to those of ordinary skill in the art.

It may be desirable to clock all sensor portions (42), such as by aligning all sensor portions (42). For instance, sensor portions (42) may be clocked by rotating each sensor portion (42) until the bottom of each sensor portion (42) is the same distance from outer surface (26) of camera mount (20) as the bottom of other sensor portions (42). Sensor portions (42) may also be clocked by aligning the respective bottom edges of all sensor portions (42) such that they are all parallel. Such clocking methods may be done in the embodiment where housing (92) of lens assembly (90) comprises two portions screwably secured together, such that each sensor portion (42) may be rotated, or in any other suitable embodiment. In yet another embodiment, sensor portions (42) are activated, and video captured by sensor portions (42) is viewed. In this embodiment, clocking may be performed by rotating sensor portions (42) until objects or features within captured images are consistently aligned among views from adjacent sensor portions (42). It will be appreciated that clocking may initialize the search space for a mosaicking algorithm. Other methods for clocking or aligning sensor portions (42) will be apparent to those of ordinary skill in the art.

In the present example, when cameras (40) are located approximately 7.6 km, or approximately 25,000 ft, above the ground (e.g., cameras (40) mounted in an aircraft (10)), cameras (40) may collectively view and capture an image of an area (a "footprint") that is approximately 11 km by approximately 11 km. Cameras (40) may be configured such that such an image has a resolution of approximately 0.5 meters. By way of example only, cameras (40) may provide approximately 50% contrast of features larger than 0.5 meters in size within an approximately 11×11 km ground footprint from an altitude of approximately 7.6 km. It will be appreciated that the size of the ground footprint associated with cameras (40) may vary as a function of cameras' (40) altitude, as may resolution. For instance, in one embodiment, where cameras (40) provide a resolution of 0.5 m from an altitude of 7.6 km, cameras (40) may provide a resolution of 1.2 m from an altitude of 18 km. Other suitable degrees of resolution, altitudes, and footprint sizes may be used.

Cameras (40) of an exemplary image capture system incorporate sensors that are all of the same effective focal length and entrance pupil size thus sampling a scene at a constant angular rate. A sensor with a lens well corrected for geometrical distortion each pixel linearly maps a plane onto the respective sensor array. With uniform angular resolution from sensor to sensor the composite scene observed by an image capture system may be uniformly scaled for planes at a constant distance from the respective sensor. When the scene being sampled is at multiple distances from the image capture system, the change in scale may be proportional to the change in distance to the scene. In principle, it may be as though the origin of the coordinate system for each sensor entrance pupil is co-located at a common point, and the respective pupil plane is simply rotated about that point to sample the entire image capture system field-of-view. This quantity may provide a means for adjacent sensors to sample more or less of a common volume of the image capture system field-of-view. Each sensor may sample the image capture system field-of-view and each pixel of the respective sensor array may sample the respective sensor sample. It may also be possible to have each sensor designed to scale the volume of the image capture system field-of-view such that a plane perpendicular to the image capture system boresight direction is sampled by the inverse of the angle.

To the extent that cameras (40) are used to capture video images, such video may have any suitable frame rate. For instance, a suitable frame rate may be greater than or equal to approximately 5 frames per second. Alternatively, any other suitable frame rate may be used, including less than 5 frames per second. Each camera (40) may also capture images with an exposure time of approximately 1 ms, with an aperture of approximately f2.8, using an ND4 neutral density filter. Other suitable exposure times, aperture settings, and filter selections will be apparent to those of ordinary skill in the art.

It may be desirable to provide some degree of calibration of cameras (40) mounted to camera mount (20). Such calibration may be used to detect and/or correct mounting inaccuracies or inconsistencies of sensor portions (42) or lens portions (44). For instance, calibration may be provided to facilitate adjustment of cameras (40) such that their respective lines of sight all intersect at a single common point to the greatest extent possible. Calibration may also be provided to provide a consistent distance from each sensor portion (42) to its respective first lens (94). To the extent that cameras (40) may not be ideally adjusted for whatever reason, calibration may be used to obtain some corrective factor or factors to be accounted for during image processing. In other words, structural or other imperfections discovered during calibration may be accounted for during image processing, to address adverse effects that would otherwise be caused by such imperfections.

In one exemplary calibration method, lens portions (44) are used to project light onto a planar checkerboard pattern (not shown) positioned beneath camera mount (20). Checkerboard pattern comprises a plurality of squares, each square being associated with a respective lens portion (44). Each lens portion (44) is adjusted relative to camera mount (20) until light shone through lens portion (44) is centered in its corresponding square in the checkerboard pattern.

In another exemplary calibration method, a collimator (not shown) is positioned under the center of camera mount (20). The collimator is configured to rotate about two axes. Light is provided to and by the collimator, and collimator is rotated about the two axes to selectively direct the light into each camera (40). If needed, each lens portion (44) is adjusted relative to camera mount (20) to ensure that light provided by the collimator reaches sensor portion (42) secured to such lens portion (44) when collimator is directed toward corresponding camera (40). Those of ordinary skill in the art will appreciate that the foregoing calibration structures and methods are merely exemplary, and that any other suitable calibration techniques may be used.

Calibration may also be used to account for hardware errors or aberrations (e.g., defects in a lens element (94, 96, 98), defects in a sensor, etc.), certain environmental factors, or other factors that it may be desirable to take into account during image processing. By way of example only, any of the following may be determined during calibration: geometrical distortion and/or non-uniform illumination over the field of view, non-uniform response of each pixel in an array, dead pixels in an array, non-uniform gain and/or offset for each pixel in an array, etc. Such errors or factors may be characterized during calibration and corrected or otherwise addressed during image processing.

It will be appreciated that images captured by cameras (40) (e.g., images captured substantially simultaneously) may be combined to form a wide angle image, such as a wide angle video image. Of course, images captured by cameras (40) could alternatively be combined to form an image having any suitable field of view, such as a narrow field of view. It will further be appreciated that images captured by cameras (40) may be processed and presented to a user in an interactive fashion. For instance, referring back to FIG. 1, images captured from within aircraft (10) may be transmitted to a user at a ground station (14) or elsewhere. Where at least a portion of a wide angle image captured collectively by cameras (40) is presented to a user, the user may be permitted to select a portion if this image to view in greater detail. The user may thus be provided with a "virtual pan-tilt-zoom (PTZ) camera," which may effect panning, tilting, and/or zooming within a relatively large, wide angle image for presentation of a selected portion of (or selected view within) that wide angle image to the user via a user interface. Because an array of relatively high resolution cameras (40) are used to collectively capture a wide angle image, zoomed-in portions of such a wide angle image may provide a greater resolution than may otherwise be obtained if a single camera were used to capture the same wide angle image instead of an array of cameras (40).

Figure 14:
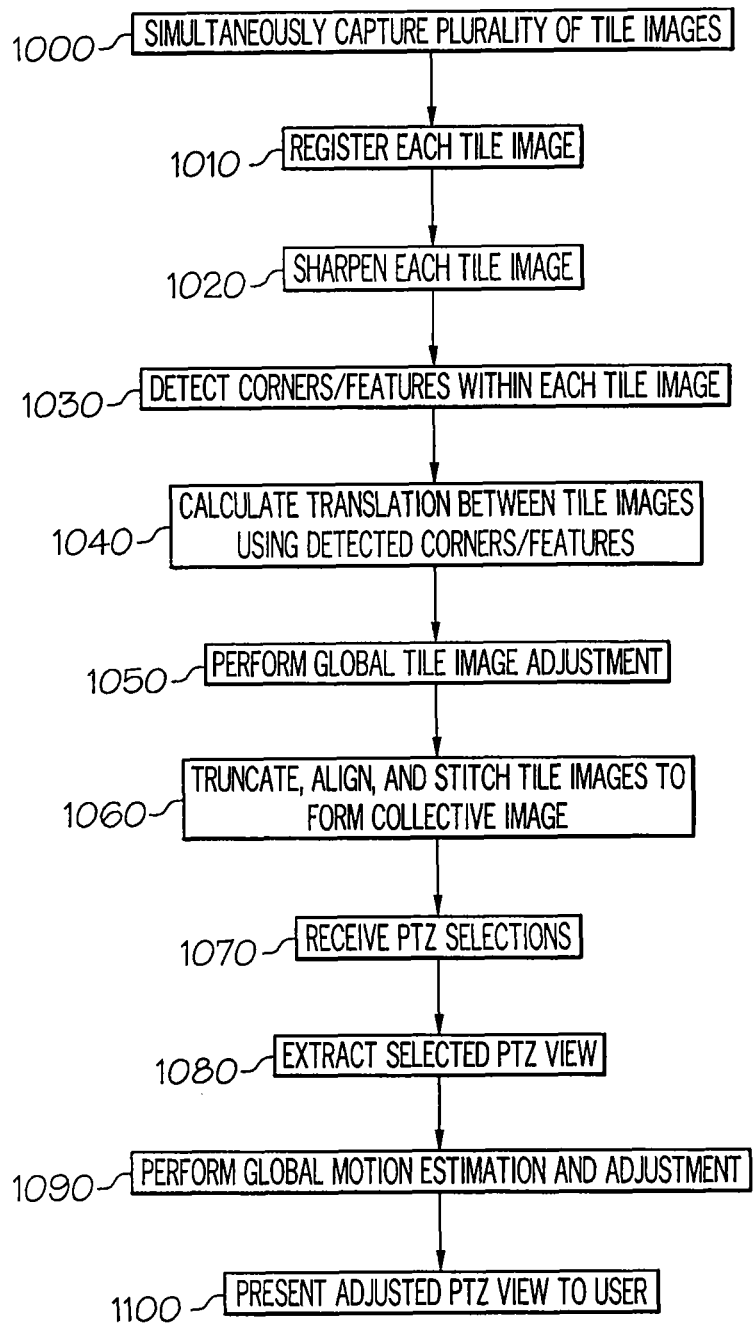
FIG. 14 depicts a flow chart showing acts in an exemplary image processing method.

FIG. 14 illustrates several acts that may be performed as part of a method for processing images captured by cameras (40). As shown in block (1000), a plurality of images are captured by cameras (40) substantially simultaneously. For purposes of this example only, each of such images will be referred to as a "tile image." As shown in block (1010), each tile image is then registered. Such registration may comprise associating each image with the particular camera (40) the image was captured with, the time the image was captured, a geographic location within the field of view provided by the image, and/or any other information. Next, as shown in block (1020), each tile image is sharpened. Such sharpening may comprise brightness correction, contrast enhancement, fixed pattern noise removal, gamma correction, dead pixel detection and interpolation, white clip, de-warping, vignetting correction, and/or any other suitable processes.

As shown in block (1030), the sharpened tile images may be subject to corner detection. While the term "corner detection" is used to designate this act, it is not intended to necessarily limit the act to the detection of corners (e.g., corners of a tile image or corners within a tile image) only. Indeed, any suitable features within a tile image may be detected as part of this act. For instance, detected tile image features may comprise image locations having gradients in all directions at a predetermined scale. It will be appreciated that the corner detection may provide a plurality of reference points within an image, and that such reference points may be useful later in processing.

Next, as shown in block (1040), motion (e.g., translation, affine, projective, etc.) between each tile image is detected using the corners/features detected in block (1030). As noted above, mosaicking techniques may be used to eliminate motion between such tile images (e.g., motion or translation of one tile image relative to another tile image). In the present example, this act comprises comparing the relative locations of detected corners/features within adjacent tile images that have been captured at the same time. In addition, as shown in block (1050), global motion estimation and adjustment may be performed. In contrast to the mosaicking associated with block (1040), which is focused on adjacent tile image pairs, global motion estimation is focused more on the collection of tile images. In particular, global motion estimation may include a comprehensive comparison of a plurality of motion or translation findings and/or corrections that were made in block (1040). Such global motion estimation may thus be used to detect and correct any errors that occurred during the motion detection and correction that occurred in block (1040).

The processing performed in accordance with blocks (1040, 1050) may reveal that the tile images captured in block (1000) were appreciably misaligned relative to each other when they were initially captured. It will therefore be apparent to those of ordinary skill in the art that some degree of spatial overlap among the views associated with adjacent tile images may facilitate the process performed in accordance with block (1040), by permitting common corners/features to be detected in more than one tile image during performance of the act corresponding to block (1030). Such overlap may also reduce the likelihood of gaps in image data occurring. Accordingly, in the present example, images obtained by cameras (40) have some degree of overlap. For instance, an image obtained by a given camera (40) may have approximately 42% or 43% overlap with images obtained by cameras (40) adjacent to that particular camera (40). Alternatively, any other suitable degree of overlap may be used.

Having determined the proper relative positioning of tile images through the processing described above with reference to blocks (1030, 1040, 1050), the process of the present example proceeds to block (1060), where tile images are truncated, aligned, and stitched together to form a collective image. Of course, a collective image created in accordance with block (1060) need not necessarily include all tile images stitched together. For instance, and as will be better understood after discussion of block (1070), a collective image may comprise portions of several tile images, a single tile image, or even a portion of a single tile image. It will be appreciated that stitching in accordance with block (1060) may be performed in substantially real time (e.g., stitching as images are being captured by cameras (40)). Alternatively, stitching may be performed at a later time, such as after tile images have been stored for some time. It will also be appreciated that tile images may be orthorectified (e.g., such that the center of cameras (40) appears to be at infinity) prior to, during, or after stitching. To the extent that orthorectification or a similar technique is used stitching may be performed by correlating features within each tile image with features on a map or model. Such correlation may be used in lieu of (or in addition to) corner detection discussed above with reference to block (1030). Other suitable stitching techniques will be apparent to those of ordinary skill in the art.

As previously noted, a user may be provided with a "virtual pan-tilt-zoom (PTZ) camera," which may effect panning, tilting, and/or zooming within the image created in block (1060). The user may thus be permitted to selectively view selected portions of (or selected views within) the wide angle image via a user interface. Accordingly, and as shown in block (1070), a user's PTZ selections may be received. Such PTZ selections may be indicative of the image region, view perspective, and/or zoom level desired by the user. In response to such PTZ selections, the region of the collective image corresponding to the selected PTZ view may be extracted, as shown in block (1080).

To the extent that cameras (40) are located in a moving platform (e.g., flying aircraft (10)) when tile images are captured in accordance with block (1000), it will be appreciated that a PTZ view extracted in accordance with block (1080) may tend to "move" with the platform. To the extent that such movement is undesirable, and it is desired that the extracted PTZ view appear as if it were being captured by cameras (40) secured to a platform having a fixed location, additional processing may be used to provide the appearance of a static or fixed perspective. Accordingly, as shown in block (1090), a global motion estimation and adjustment may be performed. Such a process may account for movement of the platform by essentially cancelling such movement from the extracted PTZ view.

The global motion estimation may be performed in a variety of ways. For instance, in one embodiment, a global motion estimation method comprises a random sample consensus algorithm (RANSAC). For instance, RANSAC may be used to provide homography mapping between consecutive frames or images captured by cameras (40). In the present example, this is performed at a global level (e.g., using images captured simultaneously by a plurality of cameras (40)), though it may also be performed at the tile level (e.g., using images captured by a single camera (40)). Global motion estimation may also be based, at least in part, on physical parameters, such as the speed and altitude of aircraft (10), by way of example only. Other suitable methods for performing global motion estimation will be apparent to those of ordinary skill in the art. Similarly, suitable methods for effecting global motion adjustment will be apparent to those of ordinary skill in the art. For instance, the camera (40) source(s) for extracted PTZ images may be changed as the platform moves, thereby providing an appearance of a fixed perspective in the extracted PTZ image.

Having processed the tile images in accordance with the foregoing exemplary processes, and as shown in block (1100), an adjusted PTZ view may be provided to the user in accordance with their selections.

As another optional image processing act, images captured by cameras (40) may be registered with geographical ground coordinates corresponding to a geographical area within the field of view of cameras (40). Such "geo-registration" may provide correlation between a view of a particular camera (40), or a portion of such a view, and a corresponding location on a map. Geo-registration information may be obtained using any suitable techniques. For instance, information relating to the geographical position of aircraft (10) may be obtained using GPS technology or other technology, and may be correlated with images captured by cameras (40), as a function of time, in order to obtain at least a rough idea of the geographical location being viewed by cameras (40) at such time. Resolution or accuracy of geo-registration information may be refined by accounting for additional factors, such as the line-of-sight orientation of the camera(s) (40) associated with selected image portions, together with altitude information, by way of example only. Another technique for obtaining geo-registration information may comprise recognizing and correlating objects detected within the field of view of cameras (40) (e.g., using object recognition logic) with objects having a known geographic locations, such as prominent landmarks, etc. Other methods of obtaining geo-registration information will be apparent to those of ordinary skill in the art.

Geo-registration information may be transmitted with images captured by cameras (40), or may otherwise be obtainable based on data relating to images captured by cameras (40). For instance, geo-registration may be performed within aircraft (10), at ground station (14), and/or elsewhere. To the extent that geo-registration information may be transmitted with images, such geo-registration information may be provided as annotations to images or may be otherwise provided.

As yet another optional processing act, persons or objects of interest may be tracked (e.g., automatically). For instance, such tracking may comprise automatically adjusting the view presented (1100) to the user such that the person/object of interest remains substantially centered within the presented view as the person/object moves. Where cameras (40) are mounted to a movable platform (e.g., an aircraft (10)), automated tracking may further carry over into movement of the platform (e.g., by automatic control, by providing tracking navigation information to a pilot, etc.), to the extent that the person/object of interest would otherwise leave the collective field of view of cameras (40) mounted to the platform. Tracking may occur at a tile image level and/or at a globally fused image level. Other methods for effecting tracking will be apparent to those of ordinary skill in the art.

It will also be appreciated that there are several ways in which tracking may be initiated. For instance, the image processing may include object recognition, facial feature recognition, etc., such that tracking is initiated upon recognition of a particular object, person, event, etc. Alternatively, as a variation of tracking, object/facial/event recognition may be used to detect a particular object/person/event within the collective field of view of cameras (40), and may automatically provide a zoomed-in view of the recognized object/person/event. Tracking may also be initiated in accordance with a user selection provided through a user interface. For instance, a user may "click on" an object of interest, or provide some other form of input to designate an object of interest, and the designated object may be tracked accordingly. Initiation of tracking may also be a combination of automatic and manual. For instance, a recognition algorithm may recognize a person or object of interest, and present a user, via a user interface, with the option to decide whether the person or object should be tracked. In this embodiment, the user may zoom in on the person or object for further inspection in order to determine whether tracking is warranted. If tracking is desired, the user may indicate the same through a user interface, and the person or object may be tracked accordingly. It will be appreciated that still other methods for initiating tracking may be used, to the extent that tracking is available.

It will be appreciated that the foregoing processes are merely exemplary, and that any of the acts may be modified, substituted, supplemented, or omitted. The acts may also be re-ordered, and similarly, the output of one act may be fed back as an input for a second iteration of a prior act. For instance, a collective image created in block (1060) may consist solely of corrected and stitched tile images corresponding to a user's PTZ selections received per block (1070). It will therefore be appreciated that image processing may be streamlined based on a user's PTZ selections, such that only portions of image data corresponding to the user's indicated area of interest are processed. Alternatively, the tiled images outside the user's indicated area of interest may still be processed, such as for storage or other purposes.

It will also be appreciated that processing may be executed on hardware at various locations. For instance, the processing may occur on hardware that is substantially co-located on the platform with cameras (40) (e.g., located within aircraft (10)), such that the adjusted PTZ view is transmitted to the user from the platform. Alternatively, registered tile images may be transmitted from the camera (40) platform to a remote location, where hardware performs the acts corresponding to blocks (1020, 1030, 1040, 1050, 1060, 1070, 1080, 1090, 1100). Still other ways in which image processing acts may be allocated among hardware at various locations will be apparent to those of ordinary skill in the art.

In the present example, a user interface permits users to view at least a portion of one or more images captured by one or more cameras (40), and further permits users to provide PTZ selections, such as those described above, as input. A user interface may also incorporate a feature such as an interactive map. To the extent that cameras (40) are secured to a moving platform (e.g., flying aircraft (10)), an interactive map may provide a substantially real time visual indication of the geographical area within the collective field of view of cameras (40). An interactive map may also permit the user to select geographical areas of interest, and a PTZ view of such areas may be provided in response to such selections. An interactive map may therefore provide an instrument for making PTZ selections as described above. To the extent that an area of interest indicated using an interactive map is not currently within the field of view of cameras (40), a user's interaction with such a map to indicate such area of interest may effect transport of aircraft (10) to a position where the indicated area of interest is within field of view of cameras (40). An interactive map may thus provide a remote control of aircraft (10) (or other vehicle), in addition to providing an instrument for making PTZ selections. An interactive map may have any other suitable features.

As another merely illustrative example, a user interface may comprise or share similarities with any of the user interfaces described in U.S. Application Publication No. 2006/0033813, entitled "Immersive Surveillance System Interface," the disclosure of which is incorporated by reference herein. For instance, a collective image described herein may be presented in a manner similar to the equirectangular image described in that publication; with PTZ selections and views described herein being made and presented in a manner similar to the PTZ selections and views described in that publication, respectively. Alternatively, the user interface described in that publication may be modified to suit the present examples, and variations thereof, in any other suitable ways. Still other ways in which a user interface may be provided will be apparent to those of ordinary skill in the art. It will also be appreciated that image capture systems described herein may be combined with image capture systems such as those described in U.S. Application Publication No. 2006/

0033813, and that views provided by such combined image capture systems may be correlated in a variety of ways, including but not limited to using correlation methods described in that publication.

Those of ordinary skill in the art will appreciate that an image capture system employing camera mount (20), cameras (40), and image processing such as that described above may be used in a variety of ways. While several exemplary uses will be described below, such examples are not intended to be exhaustive in any way. Indeed, a variety of other uses, including but not limited to variations of those described below, will be apparent to those of ordinary skill in the art.

One exemplary use comprises a terrorist bombing retrace. For instance, camera mount (20) with cameras (40) may be positioned within an aerostat (or other airborne platform), with cameras (40) persistently capturing images of an urban area while the aerostat is floating over the urban area. Images captured by cameras (40) may be stored in a storage device located within the aerostat and/or may be transmitted to a remote location (e.g., ground station (14)), for storage and/or review. If a car bomb or other device explodes, images captured by cameras (40) may be reviewed for details of the explosion. For instance, a user interface may permit a user to zoom in on the region of the image where the explosion occurred, then backtrack through the video to determine the source of the bomb. In the case of a car bomb, the user interface may permit the user to "rewind" video captured by cameras (40) to determine the type of car used, the route driven by the car prior to its explosion, the car's origin, the identity of the driver, etc. The cameras (40) and user interface may also be used to evaluate activity following the explosion. For instance, video captured by cameras (40) may be monitored to look for and track terrorists fleeing the scene of the explosion. To the extent that an image capture system further includes other cameras (e.g., PTZ cameras, etc.) fixedly located throughout the urban area, views obtained using cameras (40) may be correlated with views obtained by such fixed cameras to provide additional perspectives of people, places, events (e.g., explosions), or things of interest. Other ways in which cameras (40) may be used to provide information relating to a bombing incident or similar incident will be apparent to those of ordinary skill in the art.

Another exemplary use of cameras (40) on camera mount (20) comprises the provision of a tactical "eye in the sky" view for military reconnaissance or similar purposes. For instance, camera mount (20) with cameras (40) may be positioned within an aircraft (10), with cameras (40) capturing images while aircraft (10) is flying over enemy territory or unknown territory. Images captured by cameras (40) may be transmitted to military command personnel located at ground station (14) in substantially real time. It will be appreciated that several users (e.g., at different locations) may simultaneously view the same or different portions of a collective image captured by cameras (40). Aircraft (10) and cameras (40) may permit commanders to interactively view activity or objects over a hill, for instance, or at other remote locations of interest, without the need to use human scouts, and in substantially real time. A user interface may initially provide a wide angle image to the user, then permit the user to select areas of interest for a closer, high resolution view. Information related to the geographical location of the area of interest may also be transmitted to the user via the user interface. The user interface may further permit such users to remotely control aircraft (10), in addition to permitting such users to effect a "virtual pan-tilt-zoom camera" within a wide angle video image. Alternatively, aircraft (10) may automatically track moving people (12) or objects of interest to provide a persistent high resolution view of such people (12) or objects and/or to provide targeting information relating to the same. Other suitable reconnaissance uses or similar uses will be apparent to those of ordinary skill in the art.

Yet another exemplary use comprises border patrol. In this example, a camera mount (20) with cameras (40) may be positioned within an aircraft (10), which may persistently fly or hover over borders. Images captured by cameras (40) may be processed to automatically detect border crossers (e.g., using motion detection and/or object recognition logic). Where border crossers are automatically or otherwise detected, a portion of the wide angle image occupied by the border crossers may be zoomed in, and the border crossers may be automatically tracked. Such automated tracking may further carry over into control of aircraft (10) flight, to the extent that the border crossers would otherwise leave the collective field of view of cameras (40) within aircraft (10). Images of border crossers may be transmitted to ground station (14), along with information related to the geographic location of the border crossers, with an alert of the border crossers' presence. As with other exemplary uses, where an image capture system further includes other cameras (e.g., PTZ cameras, etc.) fixedly located throughout the urban area, views obtained using cameras (40) may be correlated with views obtained by such fixed cameras to provide additional perspectives of people, places, or things of interest. Alternatively, a combination of camera mount (20) and cameras (40) may be used in a border patrol setting in any other suitable way. Similar implementations may include visual security (e.g., surveillance of a premises).

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. An image capture system, comprising:
   a plurality of cameras;
   a camera mount comprising a curved portion, the curved portion having an inner concave surface, an outer convex surface, and a plurality of apertures, the plurality of cameras being disposed above the outer convex surface; and
   a plurality of collars coupled to the plurality of cameras above the camera mount, wherein:
      each of the collars includes a sidewall, an inner recessed portion having an inner shoulder extending radially inward, and an outer recessed portion having an outer shoulder extending radially outward;
      the outer shoulder of each collar is adjacent to the outer convex surface of the curved portion of the camera mount and the inner shoulder of each collar is adjacent to an objective end of a lens portion of each of the cameras; and
      the plurality of collars are secured to the outer convex surface of the curved portion of the camera mount by inserting the outer recessed portion of each collar into corresponding ones of the plurality of the apertures.

2. The image capture system of claim 1, wherein:
the cameras have corresponding objective ends; and
corresponding portions of the objective ends pass through the curved portion of the camera mount.

3. The image capture system of claim 1, wherein the camera mount is secured to a movable platform.

4. The image capture system of claim 1, wherein the camera mount is secured to an aerial vehicle.

5. The image capture system of claim 4, wherein the camera mount is secured within an interior of a fuselage of the aerial vehicle.

6. The image capture system of claim 4, wherein lines of sight of the cameras intersect at a common point proximate to a window in a bottom portion of a fuselage of the aerial vehicle.

7. The image capture system of claim 6, wherein the curved portion of the camera mount has a diameter, the window has a diameter, and the diameter of the camera mount is greater than the diameter of the window.

8. The image capture system of claim 1, wherein:
sidewalls of the collars include angled portions defining frusto-conical apertures;
the inner recessed portions are configured to secure objective ends of the cameras to the outer convex surface of the curved portion of the camera mount; and
the sidewalls include threaded openings such that the objective ends of the cameras may be secured to the collars by means of inserting and tightening set screws into the corresponding threaded openings.

9. The image capture system of claim 1, wherein:
the cameras have corresponding objective and sensor ends separated by corresponding displacements; and
a first one of the cameras is configured to allow adjustment of a position of the corresponding sensor end, the sensor end position being measured relative to a position of the corresponding objective end.

10. The image capture system of claim 1, wherein:
the cameras have corresponding objective and sensor ends separated by corresponding displacements; and
each of the cameras is configured to allow the displacement between its objective end and its sensor end to be adjusted.

11. The image capture system of claim 1, wherein:
the cameras have corresponding objective and sensor ends separated by corresponding displacements;
at least one of the cameras is configured to allow the displacement between its objective end and its sensor end to be adjusted; and
the cameras include sensor portions configured to sample a field-of-view of the image capture system.

12. An image capture system, comprising:
a camera mount comprising a curved portion, the curved portion having an inner concave surface, an outer concave surface, and a plurality of apertures;
a plurality of cameras;
a plurality of collars coupled to the plurality of cameras above the camera mount, the plurality of cameras being disposed above the outer concave surface of the camera mount, wherein the cameras comprise:
lens assemblies comprising barrels and one or more corresponding lens elements, and
sensor portions secured to corresponding ones of the lens assemblies, wherein the sensor portions are operable to capture image data representing views obtained through the lens assemblies, and the sensor portions are separated from the lens assemblies by corresponding displacements; and
a processor in communication with the sensor portions, wherein the processor is configured to create a two-dimensional image from image data captured substantially simultaneously with the sensor portions,
wherein:
at least a portion of views obtained through adjacent lens assemblies overlap;
each of the collars includes a sidewall, an inner recessed portion having an inner shoulder extending radially inward, and an outer recessed portion having an outer shoulder extending radially outward;
the outer shoulder of each collar is adjacent to the outer convex surface of the curved portion of the camera mount and the inner shoulder of each collar is adjacent to an objective end of a lens portion of each of the cameras; and
the plurality of collars are secured to the outer convex surface of the curved portion of the camera mount by inserting the outer recessed portion of each collar into corresponding ones of the plurality of the apertures.

13. The image capture system of claim 12, further comprising a display located remotely relative to the cameras, wherein the display is in communication with the processor, and is operable to display at least a portion of the created two-dimensional image.

14. The image capture system of claim 12, wherein the cameras are associated with corresponding shutters.

15. The image capture system of claim 14, wherein the shutters comprise control logic in communication with the sensor portions of corresponding cameras.

16. The image capture system of claim 15, wherein the shutters comprises at least one global shutter in communication with the sensor portions, the plurality of cameras being operable to capture images simultaneously in accordance with the global shutter.

17. The image capture system of claim 12, wherein:
sidewalls of the collars include angled portions defining frusto-conical apertures;
the inner recessed portions are configured to secure objective ends of the cameras to the outer convex surface of the curved portion of the camera mount; and
the sidewalls include threaded openings such that the objective ends of the cameras may be secured to the collars by means of inserting and tightening set screws into the corresponding threaded openings.

18. The image capture system of claim 12, wherein:
the cameras have corresponding objective and sensor ends separated by corresponding displacements; and
a first one of the cameras is configured to allow adjustment of a position of the corresponding sensor portion, the sensor portion position being measured relative to a position of the corresponding lens assembly.

19. The image capture system of claim 10, wherein first and second ones of the plurality of cameras are configured so as to allow modification to a corresponding displacement to align the images captured by the first and second cameras.

20. The image capture system of claim 12, wherein:
the cameras have corresponding objective and sensor ends separated by corresponding displacements; and
each of the cameras is configured to allow the displacement between its objective end and its sensor end to be adjusted.

21. The image capture system of claim 20, wherein first and second ones of the plurality of cameras are configured so as to allow the modification to a corresponding displacement to align the image data captured by the first and second cameras.

22. The image capture system of claim 12, wherein:
the cameras have corresponding objective and sensor ends separated by corresponding displacements;
at least one of the cameras is configured to allow the displacement between its objective end and its sensor end to be adjusted; and
the cameras include sensor portions configured to sample a field-of-view of the image capture system.

\* \* \* \* \*